(12) United States Patent
Ochiai

(10) Patent No.: US 7,973,881 B2
(45) Date of Patent: Jul. 5, 2011

(54) PLANE LIGHT SOURCE APPARATUS AND LIQUID CRYSTAL DISPLAY APPARATUS

(75) Inventor: Masahiro Ochiai, Kanagawa (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 12/268,505

(22) Filed: Nov. 11, 2008

(65) Prior Publication Data

US 2009/0122230 A1   May 14, 2009

(30) Foreign Application Priority Data

Nov. 14, 2007 (JP) ................................. 2007-295552

(51) Int. Cl.
*G02F 1/1335* (2006.01)
(52) U.S. Cl. ........................................................ 349/65
(58) Field of Classification Search ....................... 349/65
See application file for complete search history.

(56) References Cited

U.S. PATENT DOCUMENTS

| | | | | |
|---|---|---|---|---|
| 2008/0002101 A1* | 1/2008 | Akiyama | .......................... | 349/65 |
| 2008/0129927 A1* | 6/2008 | Hamada et al. | .................. | 349/65 |
| 2010/0110339 A1* | 5/2010 | Ajichi et al. | ..................... | 349/65 |

FOREIGN PATENT DOCUMENTS

| | | |
|---|---|---|
| JP | 2002134284 | 5/2002 |
| JP | 2003-337332 | 11/2003 |
| JP | 2004-253309 | 9/2004 |
| JP | 2006-054312 | 2/2006 |
| JP | 2007128822 | 5/2007 |
| WO | WO2007125623 | 11/2007 |

OTHER PUBLICATIONS

Japanese Patent Office Action corresponding to Japanese Serial No. P2007-295552 dated Sep. 29, 2009.

* cited by examiner

*Primary Examiner* — Sung H Pak
(74) *Attorney, Agent, or Firm* — SNR Denton US LLP

(57) ABSTRACT

The present invention provides a plane light source apparatus includes a light guide plate having a flat face portion and an end face portion. A plurality of point light sources are disposed in an opposing relationship to the end face portion of the light guide plate. The light guide plate mixes light from the point light sources incoming from the end face portion thereof and emit the mixed light as illumination light from the flat face portion thereof. The point light sources are a combination of point light sources having chromaticities different from each other within a predetermined standard chromaticity range, and mix light from the point light sources so that the chromaticity of the resulting illumination light fits into a target chromaticity range which is narrower than the standard chromaticity range.

9 Claims, 7 Drawing Sheets

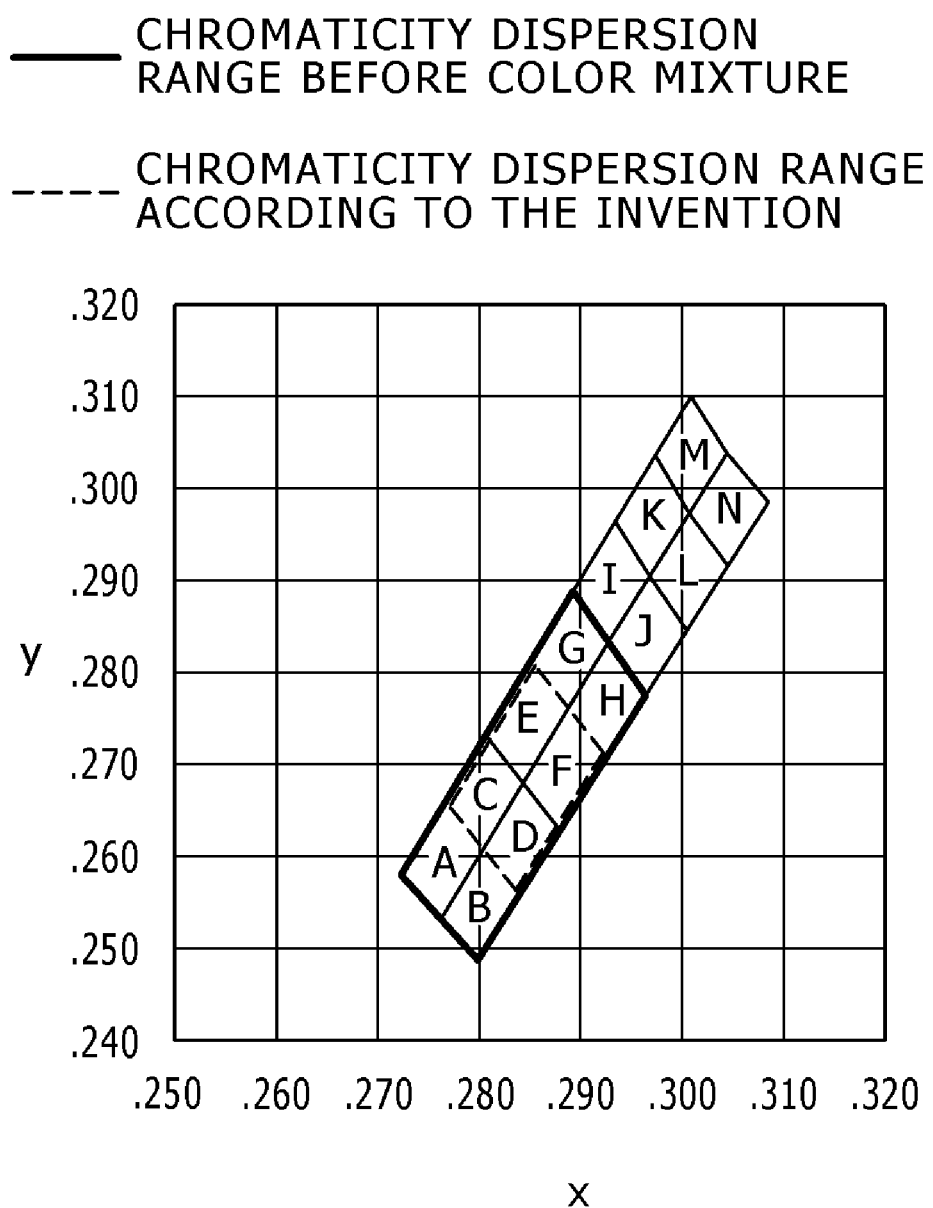

FIG.8

| WHITE LED LED-A | | WHITE LED LED-B | | TOTAL POWER | POWER RATIO |
|---|---|---|---|---|---|
| $I_A$ | VOLTAGE $V_A$ | $I_B$ | VOLTAGE $V_B$ | | |
| 10mA | 2.95V | 20mA | 3.20V | 93.5mW | 1.012 |
| 11mA | 2.97V | 19mA | 3.18V | 93.1mW | 1.007 |
| 12mA | 3.00V | 18mA | 3.15V | 92.7mW | 1.003 |
| 13mA | 3.02V | 17mA | 3.12V | 92.3mW | 0.999 |
| 14mA | 3.05V | 16mA | 3.10V | 92.3mW | 0.999 |
| 15mA | 3.08V | 15mA | 3.08V | 92.4mW | REFERENCE |
| 16mA | 3.10V | 14mA | 3.05V | 92.3mW | 0.999 |
| 17mA | 3.12V | 13mA | 3.02V | 92.3mW | 0.999 |
| 18mA | 3.15V | 12mA | 3.00V | 92.7mW | 1.003 |
| 19mA | 3.18V | 11mA | 2.97V | 93.1mW | 1.007 |
| 20mA | 3.20V | 10mA | 2.95V | 93.5mW | 1.012 |

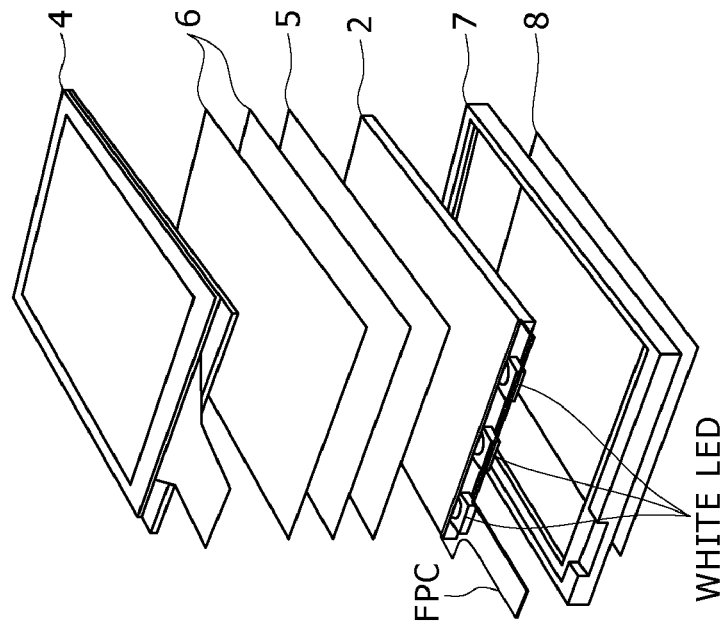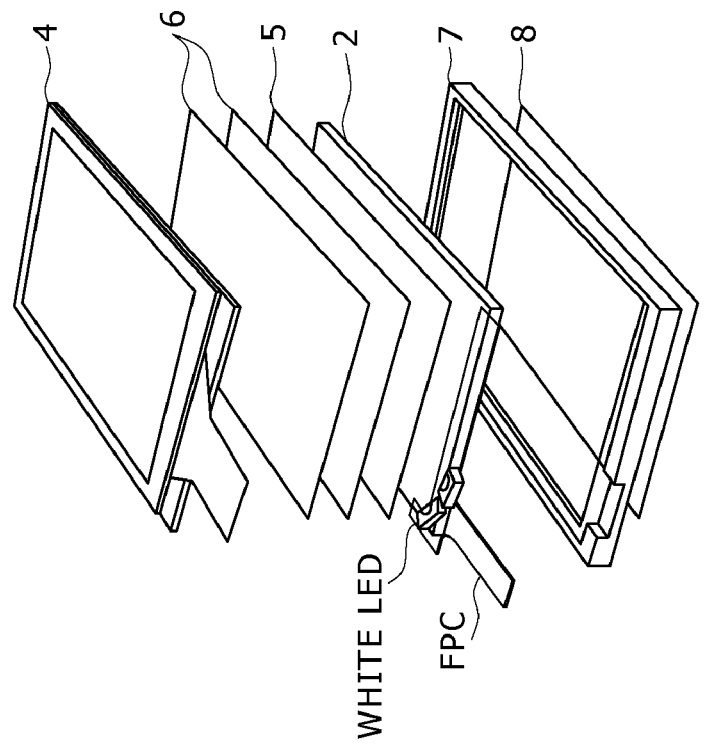

PLANE LIGHT SOURCE APPARATUS AND LIQUID CRYSTAL DISPLAY APPARATUS

CROSS REFERENCES TO RELATED APPLICATIONS

The present invention contains subject matter related to Japanese Patent Application JP 2007-295552, filed in the Japan Patent Office on Nov. 14, 2007, the entire contents of which being incorporated herein by reference.

BACKGROUND OF THE INVENTION

1. Field of the Invention

This invention relates to a plane light source apparatus which is used as a backlight for illuminating a liquid crystal display apparatus from the back side and a liquid crystal display apparatus which incorporates the plane light source apparatus.

2. Description of the Related Art

Liquid crystal display apparatus of the reflection type and the transmission type are known. The liquid crystal display apparatus of the reflection type includes a reflection plate on the back side which reflects external light to display an image on a screen thereof. Meanwhile, the liquid crystal display apparatus of the transmission type includes a backlight on the back side thereof such that illumination light from the backlight is transmitted therethrough to display an image on a screen thereof.

A plane light source apparatus is in related art utilized as the backlight. The plane light source basically includes a light guide plate having a flat face portion and an end face portion, and a plurality of point light sources disposed in an opposing relationship to the end face portion of the light guide plate. The light guide plate mixes light from the point light sources incoming from the end face portion thereof and emits the mixed light as illumination light from the flat face portion thereof. An apparatus of the type described is disclosed in Japanese Patent Laid-Open No. 2003-337332.

SUMMARY OF THE INVENTION

As one of plane light source apparatus, an apparatus is in related art known wherein a white LED (light emitting diode) is used for the plurality of point light sources. Preferably, illumination light to be emitted from a plane light source is ideally white light. However, actual plane light source apparatus have individual differences in chromaticity, but do not emit completely white light but emit somewhat colored light. A dispersion in chromaticity of such plane light source apparatus as just described arises principally from a fabrication dispersion of white LEDs used for the point light sources.

A white LED is basically formed from an LED chip for emitting blue light and a phosphor for obtaining yellow light. However, the emission light spectrum of the blue chip and the amount of the yellow phosphor which has a relationship of complementary colors have a dispersion. Such dispersion factors cannot be avoided in mass production. Accordingly, white LEDs supplied to the market do not make an ideal white light source, but white LEDs whose chromaticity is distributed within a standard chromaticity range permitted in advance are supplied. If white LEDs having a dispersion in chromaticity and supplied to the market are used as they are for point light sources of a plane light source apparatus, then the chromaticity disperses among individual plane light source apparatus and hence among individual liquid crystal display apparatus. This makes a subject to be solved.

Therefore, it is desirable to provide a plane light source apparatus which is improved in chromaticity against a dispersion.

According to an embodiment of the present invention, there is provided a plane light source apparatus includes a light guide plate having a flat face portion and an end face portion, and a plurality of point light sources disposed in an opposing relationship to the end face portion of the light guide plate, the light guide plate being operable to mix light from the point light sources incoming from the end face portion thereof and emit the mixed light as illumination light from the flat face portion thereof, the point light sources being a combination of point light sources having chromaticities different from each other within a predetermined standard chromaticity range, the light guide plate mixing light from the point light sources which have the different chromaticities from each other so that the chromaticity of the resulting illumination light fits into a target chromaticity range which is narrower than the standard chromaticity range.

Preferably, the point light sources are a combination of point light sources which have a chromaticity difference given by $\Delta x > 0.01$ and $\Delta y > 0.01$ on an XY chromaticity coordinate system which represents the standard chromaticity range.

Preferably, the plane light source apparatus further includes a plurality of current sources configured to individually supply current to the point light sources so as to emit light, the current sources being capable of adjusting the amounts of current to be supplied to the point light sources to vary the mixture ratio of the light to be emitted from the point light sources thereby to adjust the chromaticity of the resulting illumination light. In this instance, the point light sources may be white LEDs whose emission light amounts vary in response to the amounts of current supplied from the current sources.

In the plane light source apparatus, the point light sources having chromaticities different from each other within the predetermined standard chromaticity range are incorporated in combination. The light guide plate can mix light from the point light sources having chromaticities different from each other so that the chromaticity of the resulting illumination light can fit into the target chromaticity range which is narrower than the standard chromaticity range. In this manner, the plane light source has the target chromaticity range which is narrower than the standard chromaticity range of the point light sources. Therefore, the plane light source apparatus can radiate white illumination light suitable as a backlight for a liquid crystal display apparatus.

According to another embodiment of the present invention, there is provided a plane line source comprising a light guide plate having a flat face portion and an end face portion, a plurality of point light sources disposed in an opposing relationship to the end face portion of the light guide plate, and a plurality of current sources configured to individually supply current to the point light sources so as to emit light, the light guide plate being operable to mix light from the point light sources incoming from the end face portion thereof and emit the mixed light as illumination light from the flat face portion thereof, the point light sources being a combination of point light sources having chromaticities different from each other within a predetermined standard chromaticity range, the current sources being capable of adjusting the amounts of current to be supplied to the point light sources to vary the mixture ratio of the light to be emitted from the point light sources so that the chromaticity of the resulting illumination light fits into a target chromaticity range which is narrower than the standard chromaticity range.

Preferably, the current sources adjust the amounts of current to be supplied to the point light sources relative to each other while the total value of the amounts of current to be supplied to the point light sources is kept fixed.

The point light sources may be white LEDS whose emission light amounts vary in response to the amounts of current supplied from the current sources.

In the plane light source apparatus, the point light sources having chromaticities different from each other within the predetermined standard chromaticity range are used in combination. The current sources incorporated in the plane light source apparatus adjust the amounts of current to be supplied to the point light sources to vary the mixture ratio of light emitted from the point light sources so that the chromaticity of the resulting illumination light can fit into the target chromaticity range which is narrower than the standard chromaticity range. By the configuration described, the plane light source has the chromaticity distribution which is narrower than the chromaticity distribution of the point light sources. Therefore, a while plane light source apparatus which exhibits a small color distribution and is suitable as a backlight for a liquid crystal display apparatus can be obtained.

BRIEF DESCRIPTION OF THE DRAWINGS

FIG. 4 is a graph illustrating a relationship between a standard chromaticity range and a target chromaticity range;

FIG. 8 is a table illustrating operation of a current control circuit shown in FIG. 7; and FIGS. 9A and 9B are exploded perspective views showing different liquid display apparatus to which the present invention is applied.

DETAILED DESCRIPTION OF THE PREFERRED EMBODIMENT

Figure 1A:
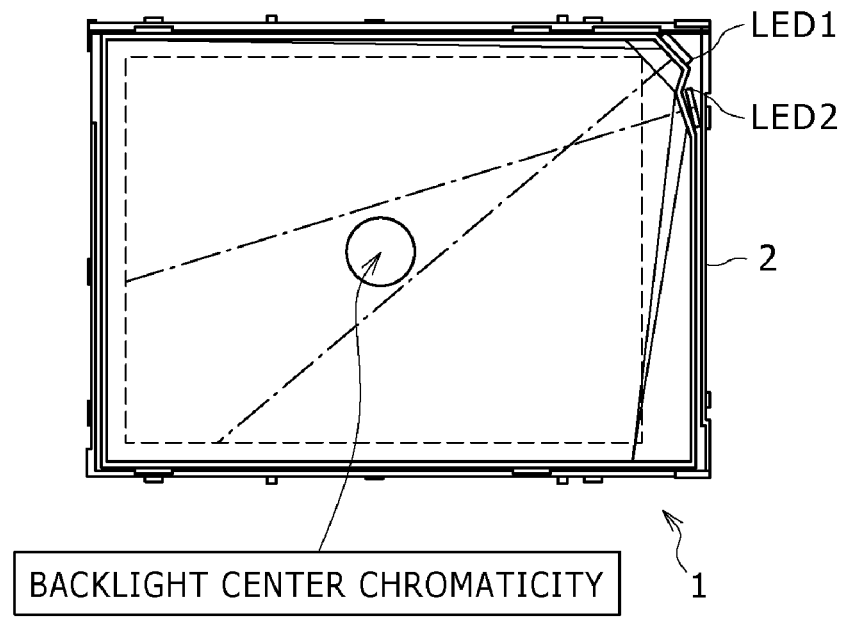
FIG. 1A is a schematic view showing a plane light source apparatus to which the present invention is applied.

The preferred embodiment of the present invention will now be described in reference to the accompanying drawings. Referring first to FIG. 1A, there is shown a configuration of a plane light source apparatus to which the present invention is applied. A plane light source apparatus 1 shown includes a light guide plate 2 and a plurality of point light sources. In the present embodiment, the point light sources are formed using a pair of white LEDs LED1 and LED2 whose emission light amount varies in response to the amount of current supplied thereto from a current source. The light guide plate 2 is made of an acrylic resin material and has a substantially rectangular flat face portion and an end face portion surrounding the flat face portion. The LEDs LED1 and LED2 are disposed in an opposing relationship to a corner portion of the rectangular light guide plate 2. The light guide plate 2 mixes light from a plurality of point light sources, that is, from the LEDs LED1 and LED2, incoming thereto from the end face portion thereof and emits the mixed light as illumination light from the flat face portion thereof.

The plural point light sources are a combination of the LEDs LED1 and LED2 which have chromaticities different from each other within a standard chromaticity range determined in advance. Although a white LED basically has a chromaticity proximate to snow white, it has a dispersion originating from a fabrication process, and the actual chromaticity disperses within a chromaticity range determined in advance. As a characteristic matter, the light guide plate 2 mixes light from the LEDs LED1 and LED2 having different chromaticities from each other so that the chromaticity of the resulting illuminating light may fit into a target chromaticity range which is narrower than the standard chromaticity range. In FIG. 1A, since light from the LEDs LED1 and LED2 mixes, the chromaticity at the center of the backlight can be restricted within a very narrow target chromaticity range.

The LEDs LED1 and LED2 are formed as a combination of white LEDs whose chromaticity difference on an XY chromaticity coordinate system representing the standard chromaticity range is $\Delta x > 0.01$ and $\Delta y > 0.01$.

Figure 1B:
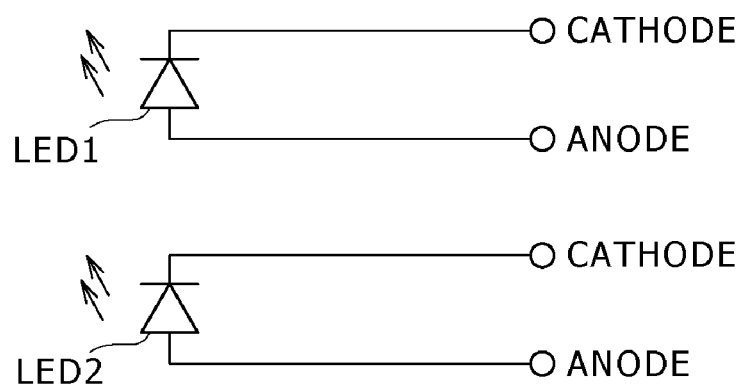
FIG. 1B is a circuit diagram showing point light sources of the plane light source.

A current source for supplying current to each of the LEDs LED1 and LED2 to emit light is provided as seen in FIG. 1B. The current source is formed as a constant current source which supplies light emission current between the cathode and the anode of the white LED. The current sources individually adjust the amounts of current to be supplied to the LEDs LED1 and LED2 to change the mixture ratio of light to be emitted from the LEDs LED1 and LED2 thereby to adjust the chromaticity of the illumination light. Preferably, the current sources adjust the amounts of current to be supplied to the LEDs LED1 and LED2 relative to each other while the total value of the amounts of current to be supplied to the LEDs LED1 and LED2 is kept fixed.

Figure 2:
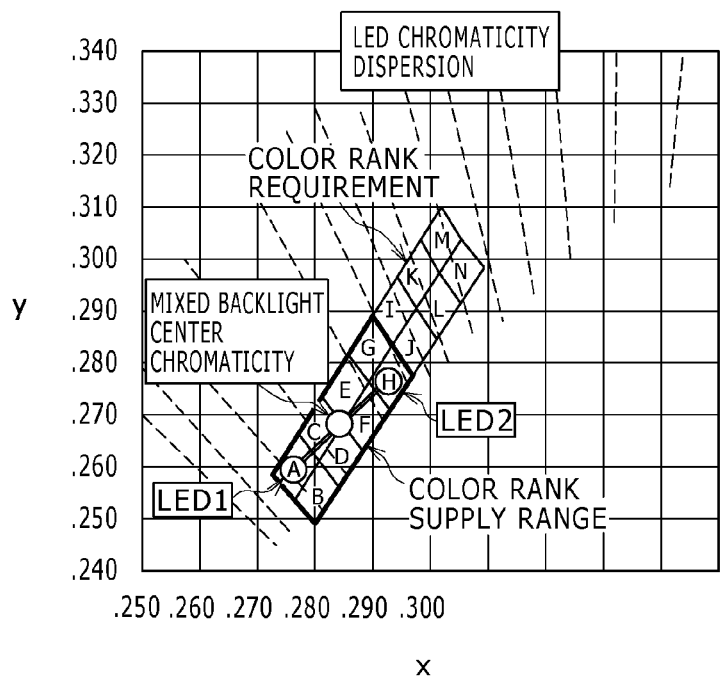
FIGS. 2 and 3 are graphs illustrating the principle of the present invention.

FIG. 2 illustrates the principle of the present invention and shows a chromaticity distribution of white LEDs and a chromaticity distribution of the plane light source apparatus on the XY chromaticity coordinate system.

As described hereinabove, a white LED has, from its structure, a dispersion in a blue LED chip and a dispersion in the weight of a yellow phosphor, and causes of the dispersions cannot be avoided in mass production and a large number of LEDs having a chromaticity in an idealistic chromaticity region cannot be supplied stably. Therefore, white LEDs supplied to the market have a comparatively large chromaticity range. Since LED makers fail to stably fabricate and stably supply white LEDS in a narrow chromaticity range, the chromaticity range of fabricated products is divided, for example, into 14 color ranks A to N as seen in FIG. 2. For example, those products whose chromaticity belongs to any the eight ranks A to H are supplied to the market. In this instance, the color dispersion between individual white LEDs is distributed within the width of the color ranks A to H. The color ranks A to H correspond to the standard color range determined in advance. When plane light source apparatus are produced, those LEDs whose chromaticity belongs to the standard chromaticity range A to H are suitably selected and incorporated into the plane light source apparatus.

In the present embodiment, a pair of LEDs LED1 and LED2 having different chromaticities from each other are selected and combined from among white LEDs classified into the eight ranks A to H. In the example illustrated in FIG. 2, the LED LED1 belonging to the rank A and the LED LED2 belonging to the rank H are combined. The LEDs LED1 and LED2 having chromaticities displaced from each other within the standard chromaticity range are disposed in a neighboring relationship to each other at a corner of the light guide plate as seen in FIG. 1A to mix light from the LEDs LED1 and LED2. The chromaticity at the center of the resulting plane light source apparatus or backlight coincides substantially with the center of the standard chromaticity range as seen in FIG. 2. In other words, a pair of LEDs LED1 and LED2 having chromaticities displaced in the opposite directions to each other from the center of the standard chromaticity range are selectively combined so that the chromaticity of the planar light source apparatus coincides with the center of the standard chromaticity range.

Figure 3:
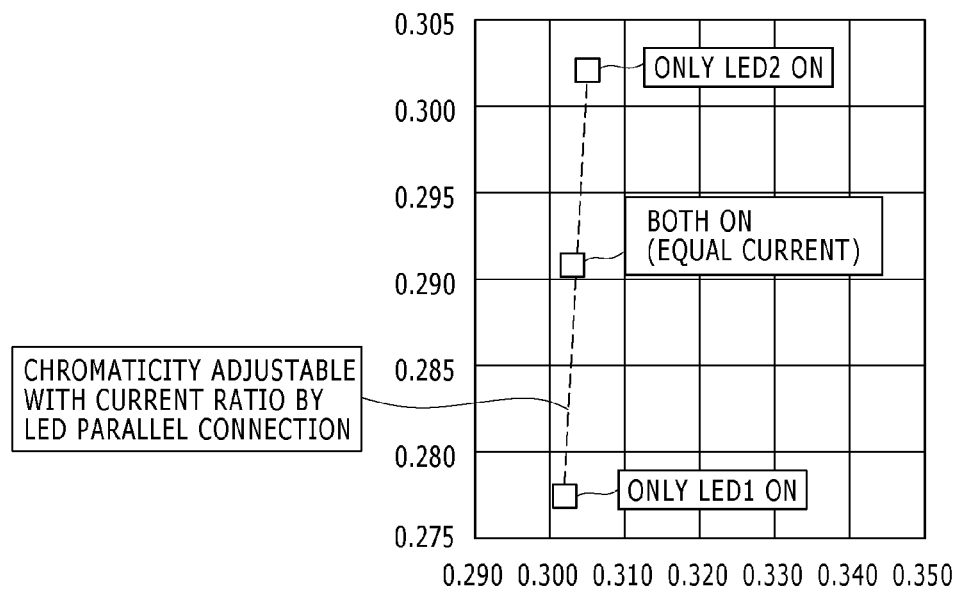

FIG. 3 illustrates a driving method for the plane light source apparatus. Referring to FIG. 3, if the LEDs LED1 and LED2 shown in FIG. 2 are driven uniformly with driving current of 15 mA to emit light, then a plane light source is obtained which emits light of a mixed color of the chromaticity A of the LED LED1 and the chromaticity H of the LED LED2. At this time, the total driving current supplied to the LEDs LED1 and LED2 is 30 mA. The chromaticity coordinates of the plane light source have values substantially at the center of a line segment drawn by interconnecting the coordinates of the LEDs LED1 and LED2 when each of the LEDs LED1 and LED2 is turned on. FIG. 3 illustrates actually measured chromaticity coordinates of a plane light source obtained by mixture of light from the LEDs LED1 and LED2.

FIG. 4 illustrates a chromaticity dispersion range of white LEDs before color light mixture and a chromaticity dispersion range of the plane light source apparatus after color light mixture for comparison. As described hereinabove, on the XY chromaticity coordinate system, the standard chromaticity range of white LEDs are divided into the eight ranks A to H. In contrast, the target chromaticity range of the plane light sources fit in the four ranks C to F. In this manner, in the present embodiment, the point light sources having different chromaticities from each other within the standard chromaticity range A to H determined in advance are combined, and the light guide plate mixes light from the point light sources having chromaticities different from each other so that the chromaticity of the resulting illumination light may fit into the target chromaticity range C to F which is narrower than the standard chromaticity range A to H. In other words, white LEDs supplied to the market have chromaticities distributed in a state wherein they are classified into the eight ranges A to H. By incorporating a pair of white LEDs, whose chromaticities are spaced away from each other, in combination from among white LEDs whose chromaticity is distributed in the standard chromaticity range into a plane light source, the chromaticity range of the plane light source can be reduced to the four ranks C to F. In this manner, even where white LEDs as point light sources have a large chromaticity dispersion, a plane light source having a narrowed chromaticity dispersion can be implemented. It is to be noted that, in the example shown, each of the divisions corresponding to the eight ranks A to H has a size of approximately $\Delta X=0.01$ and $\Delta Y=0.01$. In the present embodiment, LEDs selected from among LEDs of different ranks or divisions are combined and used for a plane light source. Thus, point light sources having chromaticities different by $\Delta X=0.01$ and $\Delta Y=0.01$ from each other are selectively combined from among a plurality of point light sources selected from among those of chromaticities in the standard chromaticity range.

Figure 5A:
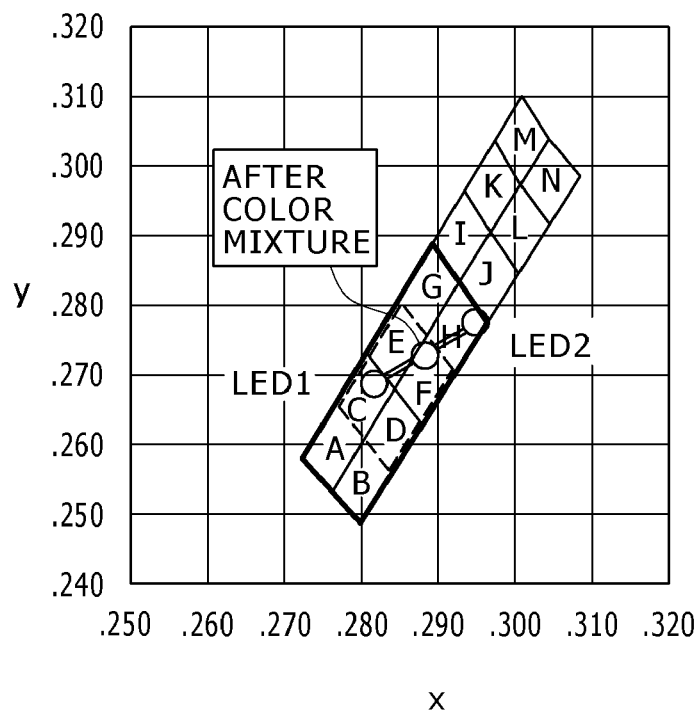
FIGS. 5A and 5B are graphs illustrating different combinations of white LEDs used in the plane light source apparatus of FIG. 1A.
Figure 5B:
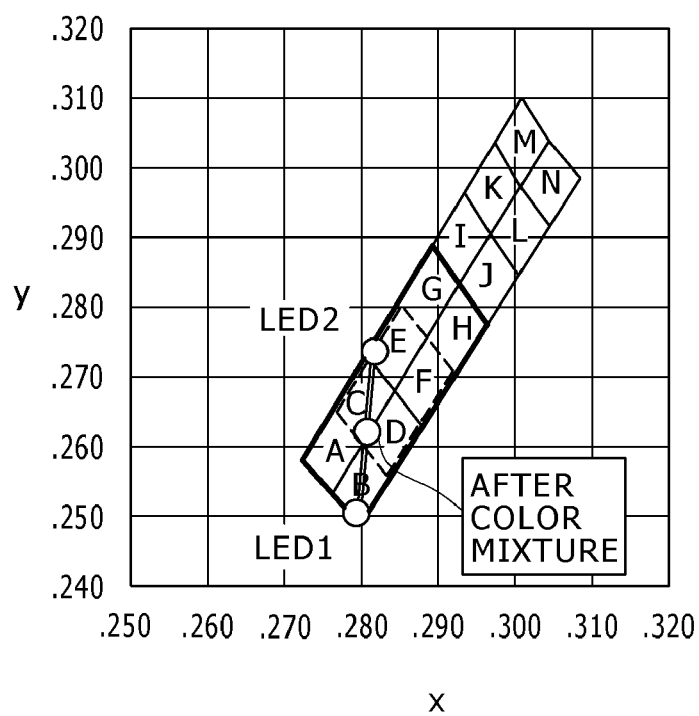

FIGS. 5A and 5B illustrate different combinations of white LEDs. In the example of FIG. 5A, the LED LED1 belonging to the rank C and the LED LED2 belonging to the rank H are combined to obtain a plane light source apparatus which belongs to the rank F. Meanwhile, in the example of FIG. 5B, the LED LED1 belonging to the rank B and the LED LED2 belonging to the rank E are combined to obtain a plane light source apparatus which belongs to the rank C or D. In this manner, according to the present embodiment, by combining LEDs which belong to the chromaticity ranges A to H, the chromaticity range of the plane light source can be narrowed to the range C to F.

Figure 6:
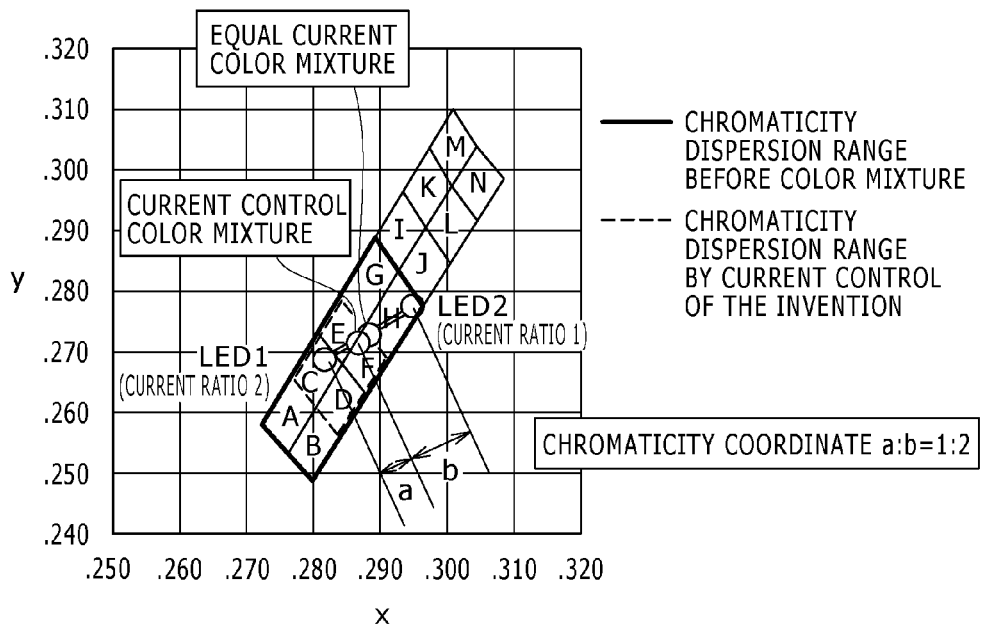
FIG. 6 is a graph illustrating a current control color mixture method of the plane light source apparatus of FIG. 1A.

FIG. 6 schematically illustrates an example of chromaticity adjustment by current control. If the current ratio is varied while the total current of 30 mA to be supplied to the LED LED1 and the LED LED2 is kept fixed, then the chromaticity of the plane light source can be adjusted freely between the chromaticities of the LED LED1 and the LED LED2. For example, if the LED LED1 is driven with current of 20 mA and the LED LED2 is driven with current of 10 mA as seen in FIG. 6, then the chromaticity coordinates of the plane light source are displaced at a ratio of a:b=1:2 to the LED LED1 side, and the target chromaticity range can be further narrowed.

In the example of FIG. 6, the LED LED1 belonging to the rank C and the LED LED2 belonging to the rank H are combined to obtain a white plane light source. If driving current of 15 mA is supplied equally to the LEDs LED1 and LED2, then the chromaticity of the plane light source after color light mixture fits into the rank F. In this instance, if both of the LEDs LED1 and LED2 have chromaticities which are not at the center of the rank C and the rank H but are displaced to the right side, then also the chromaticity after color light mixture is displaced to the right side in the rank F.

On the other hand, if current control color mixture is adopted and 20 mA is supplied to the LED LED1 side while 10 mA is supplied to the LED LED2 side, then the chromaticity of the plane light source after color mixture fits into the rank F as seen in FIG. 6. Where the target chromaticity range by equal current color mixture illustrated in FIG. 5 and the target chromaticity range by current control color mixture illustrated in FIG. 6 are compared with each other, it can be recognized that the latter target chromaticity range is narrowed to approximately one half the former target chromaticity range.

Figure 7:
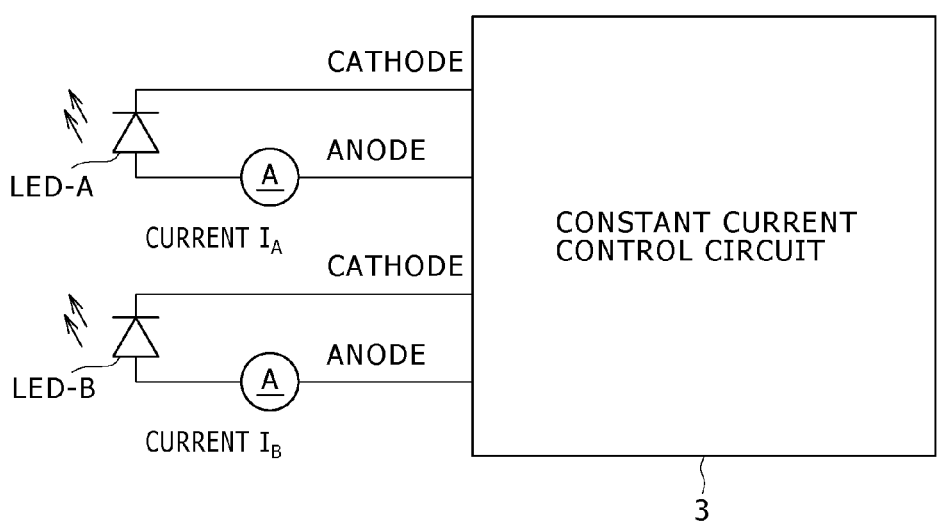
FIG. 7 is a block diagram showing a current control system of the plane light source apparatus of FIG. 1A.

FIG. 7 shows a circuit configured for implementing the current control color mixture illustrated in FIG. 6. Referring to FIG. 7, a pair of white LEDs LED-A and LED-B as point light sources are a combination of white LEDs having chromaticities different from each other within the predetermined standard chromaticity range. A current source is connected to the anode side of each of the white LEDs. Meanwhile, a constant current control circuit 3 is connected to the cathode side of the white LEDs. The current sources adjust current amounts IA and IB to be supplied to the white LEDs LED-A and LED-B, respectively, to vary the mixture ratio of light emitted from the white LEDs so that the chromaticity of the resulting illumination light to be emitted from the plane light source may fit into the target chromaticity range which is narrower than the standard chromaticity range. Thereupon, the constant current control circuit 3 adjusts the amounts of current to be supplied to the white LEDs relative to each other while the total amount of the amounts IA and IB of current to be supplied to the white LEDs is kept fixed. By such adjustment, the chromaticity of the plane light source apparatus can be adjusted freely while the power consumption thereof is kept fixed.

FIG. 8 is a table illustrating associated values of the current IA and the voltage VA of the white LED LED-A, the current IB and the voltage VB of the white LED LED-B, the total power and the power ratio, and illustrates the substance of control of the constant current control circuit 3 illustrated in FIG. 7. For example, if current of 10 mA is supplied to the white LED LED-A and current of 20 mA is supplied to the white LED LED-B, then the total power is 93.5 mW. Meanwhile, if current of 15 mA is supplied to both of the white LEDs LED-A and LED-B, then the total power is 92.4 mW. Where the values just mentioned are determined as a reference, the power ratio when 10 mA is supplied to the white LED LED-A and 20 mA is supplied to the white LED LED-B is 1.012. On the contrary, when 20 mA is supplied to the white LED LED-A and 10 mA is supplied to the white LED LED-B, the power ratio is 1.012. In this manner, the constant current control circuit 3 of FIG. 7 can keep the total power substantially fixed while the current amounts to be supplied to the pair of white LEDs are adjusted relative to each other.

FIGS. 9A and 9B schematically show different examples of a configuration of a liquid crystal display apparatus according to the present invention. Referring first to FIG. 9A, the liquid crystal display apparatus shown includes a liquid crystal panel 4 of the transmission type which receives illumination light from the back side thereof to display an image, and a plane light source disposed on the back side of the liquid crystal panel 4 to supply illumination light. The plane light source includes a light guide plate 2 having a flat face portion and an end face portion, and a plurality of point light sources disposed in an opposing relationship to the end face portion of the light guide plate 2. In the present example, the point light sources are formed as a pair of white LEDs. The white LEDs are disposed in a neighboring relationship to each other at a corner portion of the rectangular light guide plate 2 in such a state that they are carried on a flexible circuit board (FPC). The light guide plate 2 mixes light emitted from the white LEDs and incoming from the corner portion thereof and emits the mixed light as illumination light from the flat face portion thereof to illuminate the liquid crystal panel 4 from the back side. The white LEDs are connected to a power supply through the FPC not shown in the figure. It is to be noted that the white LEDs are a combination of white LEDs having chromaticities spaced away from each other within the predetermined standard chromaticity range. The light guide plate 2 mixes light from the white LEDs having chromaticities different from each other so that the chromaticity of the resulting illumination light fits into the target chromaticity range which is narrower than the standard chromaticity range.

It is to be noted that a diffusion sheet 5 and a lens sheet 6 are interposed between the liquid crystal panel 4 and the light guide plate 2. The diffusion sheet 5 diffuses the illumination light emitted from the light guide plate 2 to raise the uniformity of the illumination light. A large number of microlenses are formed on the lens sheet 6 so as to condense the diffusion light to the liquid crystal panel 4 side thereby to raise the light utilization efficiency.

The light guide plate 2 is incorporated in a resin frame 7. A reflection sheet 8 is disposed on the bottom of the resin frame 7. The reflection sheet 8 reflects light leaking from the light guide plate 2 toward the liquid crystal panel 4 side to achieve effective utilization of light source light.

FIG. 9B schematically shows another example of the liquid crystal display apparatus according to the present invention. Referring to FIG. 9B, the liquid crystal display apparatus shown is basically similar to that shown in FIG. 9A. The same sections in FIG. 9A as those in FIG. 9B are given the same reference numbers for simple understanding. However, the liquid crystal display apparatus of FIG. 9B is different from that of FIG. 9A in that it uses three white LEDS as a plurality of point light sources. The three white LEDs are mounted on an FPC and incorporated in the resin frame 7. The three white LEDs are disposed in an opposing relationship to and in an equally spaced relationship on the end face of the light guide plate 2 adjacent to one of minor sides of the light guide plate 2. The three white LEDs are connected to individually corresponding power supplies through the FPC. The three white LEDs are a combination of white LEDs having chromaticities different from one another within a predetermined standard chromaticity range. The current sources adjust the amounts of current to be supplied to the respective white LEDs to vary the mixture ratio of light emitted from the plurality of white LEDs so that the chromaticity of the resulting illumination light may fit into the target chromaticity range narrower than the standard chromaticity range.

While a preferred embodiment of the present invention has been described using specific terms, such description is for illustrative purposes only, and it is to be understood that changes and variations may be made without departing from the spirit or scope of the following claims.

What is claimed is:

1. A plane light source apparatus, comprising:
a light guide plate having a flat face portion and an end face portion; and
a plurality of point light sources disposed in an opposing relationship to the end face portion of said light guide plate,
wherein,
all of the point light sources emit light of the same color,
said light guide plate are operable to mix light from said point light sources incoming from the end face portion thereof and emit the mixed light as illumination light from the flat face portion thereof,
said point light sources are a combination of point light sources having chromaticities different from each other within a predetermined standard chromaticity range, and
said light guide plate mixes light from the point light sources which have the different chromaticities from each other so that the chromaticity of the resulting illumination light fits into a target chromaticity range which is narrower than the standard chromaticity range.

2. The plane light source apparatus according to claim 1, wherein said point light sources are a combination of point light sources which have a chromaticity difference given by $\Delta x > 0.01$ and $\Delta y > 0.01$ on an XY chromaticity coordinate system which represents the standard chromaticity range.

3. The plane light source apparatus according to claim 1, further comprising a plurality of current sources configured to individually supply current to said point light sources so as to emit light, said current sources being capable of adjusting the amounts of current to be supplied to said point light sources to vary the mixture ratio of the light to be emitted from said point light sources thereby to adjust the chromaticity of the resulting illumination light.

4. The plane light source apparatus according to claim 3, wherein said point light sources are white light emitting diodes whose emission light amounts vary in response to the amounts of current supplied from said current sources.

5. A plane light source, comprising:
a light guide plate having a flat face portion and an end face portion;
a plurality of point light sources disposed in an opposing relationship to the end face portion of said light guide plate; and
a plurality of current sources configured to individually supply current to said point light sources so as to emit light,
wherein,
all of the point light sources emit light of the same color, said light guide plate are operable to mix light from said point light sources incoming from the end face portion thereof and emit the mixed light as illumination light from the flat face portion thereof, said point light sources are a combination of point light sources having chromaticities different from each other within a predetermined standard chromaticity range, and said current sources are capable of adjusting the amounts of current to be supplied to said point light sources to vary the mixture ratio of the light to be emitted from said point light sources so that the chromaticity of the resulting illumination light fits into a target chromaticity range which is narrower than the standard chromaticity range.

6. The plane light source apparatus according to claim 5, wherein said current sources adjust the amounts of current to be supplied to said point light sources relative to each other while the total value of the amounts of current to be supplied to said point light sources is kept fixed.

7. The plane light source apparatus according to claim 5, wherein said point light sources are white light emitting diodes whose emission light amounts vary in response to the amounts of current supplied from said current sources.

8. A liquid crystal display apparatus, comprising:

a liquid crystal panel of the transmission type configured to receive illumination light from the back side thereof to display an image; and a plane light source apparatus disposed on the back side of said liquid crystal panel and configured to supply illumination light, wherein, said plane light source apparatus includes a light guide plate having a flat face portion and an end face portion, and a plurality of point light sources disposed in an opposing relationship to the end face portion of said light guide plate, all of said point light sources emit light of the same color, said light guide plate is operable to mix light from said point light sources incoming from the end face portion thereof and emit the mixed light as illumination light from the flat face portion thereof, said point light sources are a combination of point light sources having chromaticities different from each other within a predetermined standard chromaticity range, and said light guide plate mixes light from the point light sources which have the different chromaticities from each other so that the chromaticity of the resulting illumination light fits into a target chromaticity range which is narrower than the standard chromaticity range.

9. A liquid crystal display apparatus, comprising:

a liquid crystal panel of the transmission type configured to receive illumination light from the back side thereof to display an image; and a plane light source disposed on the back side of said liquid crystal panel and configured to supply illumination light, wherein, said plane light source includes a light guide plate having a flat face portion and an end face portion, a plurality of point light sources disposed in an opposing relationship to the end face portion of said light guide plate, and a plurality of current sources configured to individually supply current to said point light sources so as to emit light, all of said point light sources emit light of the same color, said light guide plate is operable to mix light from said point light sources incoming from the end face portion thereof and emit the mixed light as illumination light from the flat face portion thereof, said point light sources are a combination of point light sources having chromaticities different from each other within a predetermined standard chromaticity range, and said light guide plate mixes light from the point light sources which have the different chromaticities from each other so that the chromaticity of the resulting illumination light fits into a target chromaticity range which is narrower than the standard chromaticity range.

* * * * *